US008042168B2

(12) United States Patent
Roerig

(10) Patent No.: US 8,042,168 B2
(45) Date of Patent: Oct. 18, 2011

(54) COMPUTER MAINTENANCE METHOD AND SYSTEM

(75) Inventor: Hilmar Roerig, Miehlen (DE)

(73) Assignee: International Business Machines Corporation, Armonk, NY (US)

( * ) Notice: Subject to any disclaimer, the term of this patent is extended or adjusted under 35 U.S.C. 154(b) by 869 days.

(21) Appl. No.: 12/063,928

(22) PCT Filed: Jun. 22, 2006

(86) PCT No.: PCT/EP2006/063441
§ 371 (c)(1),
(2), (4) Date: Feb. 15, 2008

(87) PCT Pub. No.: WO2007/020120
PCT Pub. Date: Feb. 22, 2007

(65) Prior Publication Data
US 2008/0235786 A1    Sep. 25, 2008

(30) Foreign Application Priority Data
Aug. 16, 2005    (EP) ..................................... 05107502

(51) Int. Cl.
*G06F 15/16*    (2006.01)
(52) U.S. Cl. ................................. 726/11; 726/14; 726/15
(58) Field of Classification Search ........................ None
See application file for complete search history.

(56) References Cited

U.S. PATENT DOCUMENTS

| 7,194,767 | B1 * | 3/2007 | Boydstun et al. ............... 726/14 |
| 2002/0069366 | A1 * | 6/2002 | Schoettger .................... 713/201 |
| 2003/0079121 | A1 | 4/2003 | Gilman et al. |
| 2003/0120502 | A1 * | 6/2003 | Robb et al. ........................ 705/1 |
| 2003/0185207 | A1 * | 10/2003 | Nakahara ....................... 370/389 |
| 2004/0139350 | A1 * | 7/2004 | Lyon et al. ..................... 713/201 |
| 2005/0177637 | A1 * | 8/2005 | Heron et al. ................... 709/227 |

FOREIGN PATENT DOCUMENTS

WO    WO2005047991 A2    5/2005

OTHER PUBLICATIONS

Sikora, et al., "Virtual Private Infrastructure (VPI) Initiative—An Industry Consortium for Unified and Secure Web Control with Embedded Devices", Emerging Technologies and Factory Automation, Sep. 2003, pp. 288-291, vol. 1, Piscataway, NJ, USA.

* cited by examiner

*Primary Examiner* — David Pearson
(74) *Attorney, Agent, or Firm* — Roy W. Truelson

(57) ABSTRACT

Provided is a method of remotely maintaining a computer system connected to a first private network of a first organization from a maintenance computer connected to a second private network of a second organization. The first and second private networks are connected to a public network and protected from the public network by respective first and second external firewalls. The first private network is separated from the computer system using a separation firewall configured to block network traffic that initiates at the computer system and is directed to the first private network. An isolation pipe is established that extends from the separation firewall over the first private network to the first external firewall, using virtual-private-network technology. A request to log into the computer system is transmitted from the maintenance computer through the isolation pipe to the computer system.

16 Claims, 4 Drawing Sheets

COMPUTER MAINTENANCE METHOD AND SYSTEM

FIELD OF THE INVENTION

The present invention relates to the field of computer systems and methods, and more particularly without limitation to the field of remotely maintaining computer systems.

BACKGROUND AND PRIOR ART

A conspicuous trend in the modern economy has been the growth in the importance of services as opposed to material goods. Not only does the share of the service sector in industrialised economies grow, but many material goods are offered in the form of products that combine and enhance a material goods component with a services component. For example, an advanced computer system delivered by a vendor organisation to a customer organisation is now commonly purchased together with a maintenance contract for the computer system according to which the vendor or an independent service-providing organisation bear responsibility for the computer system's continued operation. The responsibility can include performing regular preventive maintenance tasks, monitoring the continued operation of the computer system, and providing repair services and replacement equipment in the event of failure.

For the service-providing organisation, one way of performing its maintenance services is to dispatch service technicians to the customer organisation. While for certain tasks such as full-scale replacement of the computer system the presence of a service technician is without alternative, visits to the customer organisation where the computer system is located are costly. Being able to remotely service a computer system saves vast amounts of service cost, since by using such methods it is in many cases not necessary to dispatch a service technician to the customer organisation.

Because of the considerable cost savings, remotely maintained computer systems are becoming more and more common in the computer industry. Conventional solutions involve attaching a modem to the computer system and connecting the modem to a public telephone line. The service provider dials into the modem over the public telephone line from a maintenance computer and remotely maintains the computer system via the modem connection. Typical maintenance tasks performed remotely in this way include microcode updates, checking and correcting errors, configuring the computer system, remotely supporting the customer organisation to perform their tasks, and helping with problems.

However, newer and more complex computer systems are demanding more and more bandwidth to perform such remote maintenance, and modems become outpaced for their limited data transfer bandwidth. At the same time, typically organisations own fast private networks or intranets that have access points to the Internet, protected by dedicated firewalls. One way of achieving higher bandwidth for remote maintenance is to use virtual private networks, which allow the service-providing organisation to connect remotely to the computer system to be maintained over the Internet and the private network of the customer organisation to perform maintenance tasks.

Typically, customer organisations are reluctant to allow such connections because they will be routed over their private network. Their main concern is that the private network can be intruded and the network security compromised by allowing a service-providing organisation to take control of a computer system inside the private network. In many cases the computer system to be maintained will be a personal computer equipped with a general-purpose operating system such as AIX, Linux, or Microsoft Windows. To perform maintenance tasks, a service technician connecting remotely will need to gain the supreme access privileges of these operating systems, known as root privileges or administrator privileges depending on the operating system. This poses a risk for the customer organisation because the computer system, which is connected to the private network of the customer organisation, can perform many potentially harmful actions to other computers in the private network. Although it is possible to configure the computer system in order to limit its capability of performing such actions, a service technician in possession of the supreme access privileges of the computer system's operating system cannot be prevented from reverting or circumventing such configurations or introducing harmful software that reverts or circumvents such configurations.

At the same time, the customer organisation frequently does have an interest in connecting the computer system to their private network, for example in order to allow a system administrator to remotely administer the computer system from an administration computer within the customer organisation. Depending on the security policy of the customer organisation, allowing a service-providing organisation to access a computer system connected to the customer organisation's private network even via modem is seen as an unacceptable risk to the customer organisation's private network.

WO 2005/047991 discloses a method for maintaining a field device by means of a maintenance computer, which is arranged in the company network of the field device manufacturer and is connected to the field device by means of said company network, a public network, and a customer network. The public network is provided with a directory server in which a customer unit and the maintenance computer are registered and which, upon the customer request, assigns a session identification number, selects the network address of a relay server connected to the public network and transmits said address to the customer unit and the maintenance computer. Said relay server and the session identification number enable to set a pair-to-pair connection for data exchange about the field devices between the customer unit and the maintenance computer in such a way that said pair-to-pair connection makes it possible to communicate by means of a firewall computer which protects the customer network and the company network.

United States patent application 20030079121 discloses a method of allowing an employee associated with a supplier enterprise to access a supplier-owned intranet from a supplier-controlled computing device located within a semiconductor fabrication facility. In one embodiment the method includes establishing an isolation pipe through the facility-owned Intranet between the node and a hub/firewall using virtual private network technology; generating a request to logon to the supplier-owned Intranet from the computing device; formatting the request in a secure Internet protocol such that the request is broken up into multiple packets, with each packet including at least a header portion and an encrypted data portion; and transmitting the formatted request through the isolation pipe over the facility-owned Intranet to the hub/firewall and then over the public Internet to the supplier-owned Intranet with end-to-end encryption.

SUMMARY OF THE INVENTION

In accordance with the present invention there is provided a method of remotely maintaining a computer system connected to a first private network of a first organisation from a maintenance computer connected to a second private network of a second organisation. The first and second private networks are connected to a public network and are protected from the public network by respective first and second external firewalls.

The method comprises separating the first private network from the computer system using a separation firewall, which is configured to block network traffic that initiates at the computer system and is directed to the first private network. Using virtual-private-network technology, an isolation pipe is established that extends from the separation firewall over the first private network to the first external firewall. The established isolation pipe is then used to transmit a request to log into the computer system, from the maintenance computer through the isolation pipe to the computer system.

The invention is advantageous because it enables a service technician of the second organisation to remotely maintain the computer system while honouring security policies and concerns of the first organisation that would disfavour granting the second organisation full access to the first private network. Because the service technician is enabled to log into the computer system at high network speed and bandwidth using any available access privileges including the supreme access privileges of the computer system, the invention enables performing a full range of remote maintenance and support procedures, thereby saving the second organisation the high cost associated with dispatching the service technician to the first organisation. Because even supreme access rights on the computer system do not entail access rights to the configuration of the separation firewall, the invention enables the first organisation to prevent the second organisation from reverting or circumventing the protection offered by the separation firewall to the first private network.

According to an embodiment of the invention, the separation firewall is configured to let pass network traffic that initiates at the first private network. This embodiment is particularly advantageous because it enables the first organisation to access the computer system from the first private network, which it owns, without having to grant the second organisation access to the first private network in exchange for benefiting from remote maintenance and support by the second organisation. Connecting the computer system to the first private network is advantageous to the first organisation because it enables administering the computer system from any number of client computers of the first organisation that are connected to the first private network. Depending on the purpose and design of the computer system, accessing the computer system from the first private network can furthermore be indispensable for providing its services to the first organisation, for example for providing database connectivity to client computers.

According to an embodiment, the separation firewall is configured to block network traffic that initiates at the first private network. This embodiment provides an additional advantage by protecting the computer system from possible attacks from within the first private network. Of particular advantage is a further embodiment, wherein the separation firewall is configured to let pass network traffic that initiates at the first private network and is directed to a network port of the computer system available for administering the computer system. In this way, the computer system can be remotely accessed for administration from client computers in the first private network while traffic on other ports can be blocked for protecting the computer system from illegitimate access. According to a further embodiment the separation firewall is configured to let pass network traffic initiating at a particular client computer in the first private network and directed to the computer system. The particular advantage lies in enabling selected access from within the first private network based on the identity of the accessing client computer, for example by allowing access from personal client computers of a selected group of administrators of the computer system.

According to an embodiment of the invention, the isolation pipe further extends through the first external firewall over the public network and then through the second firewall over the second private network to a relay server connected to the second private network. This embodiment is particularly advantageous because it enables configuring the separation firewall and the first external firewall in a highly restrictive and therefore secure way, letting pass network traffic necessary for the establishment of the isolation pipe into the first private network through the separation firewall and through the first external firewall into the public network only if its destination is the relay server. In general, the more restrictive the way in which the separation firewall and the first external firewall can be configured, the greater the acceptance a solution can expect to find with the network security managers of the first organisation. The embodiment is of further advantage because the isolation pipe extends through the second firewall into the second private network, transporting any traffic between the maintenance computer and the computer system securely over the public network.

According to an embodiment, the relay server comprises a set of network addresses of the second private network and assigns one of the set of network addresses to the computer system upon the establishing of the isolation pipe. The maintenance computer retrieves the assigned network address from the relay server. The maintenance computer then addresses the request to log into the computer system to the assigned network addresses. Because the assigned network address belongs to the relay server, the request is received by the relay server, and from there forwarded to the computer system through the isolation pipe. This embodiment is particularly advantageous because it allows the maintenance computer to be registered under any address within the second private network, including for example an address assigned by a virtual-private-network gateway of the second organisation, thus enabling the service technician to use a notebook computer as maintenance computer that connects to the second private network from outside the second organisation.

According to an embodiment, the computer system is connected to a first modem, and the maintenance computer is connected to a second modem, the first and second modem each being connected to a public telephone line. The service technician establishes a dialed telephone connection from the second modem to the first modem over the public telephone line, and transmits a command for the establishing of the isolation pipe, from the maintenance computer over the dialed telephone connection to the computer system. This embodiment is particularly advantageous because it enables the network technician to initiate the establishing of the isolation pipe at any time without having to rely on an employee of the first organisation, who upon request initiates the establishing of the isolation pipe from within the first organisation.

The invention is not limited to maintaining computer systems as such, however. In other embodiments the computer system is coupled to industrial equipment such as a field device or machine tool located within a facility of the first organisation. Having logged into the computer system through the isolation pipe, the service technician maintains the industrial equipment from the maintenance computer via the computer system. These embodiments are particularly advantageous because they enable the second organisation to remotely diagnose problems such as a malfunctioning of the industrial equipment, make recommendations on how to overcome the problems, and decide whether dispatching a service technician to the first organisation is necessary.

BRIEF DESCRIPTION OF THE DRAWINGS

In the following preferred embodiments of the invention will be described in greater detail by way of example only making reference to the drawings in which.

DETAILED DESCRIPTION

Figure 1:
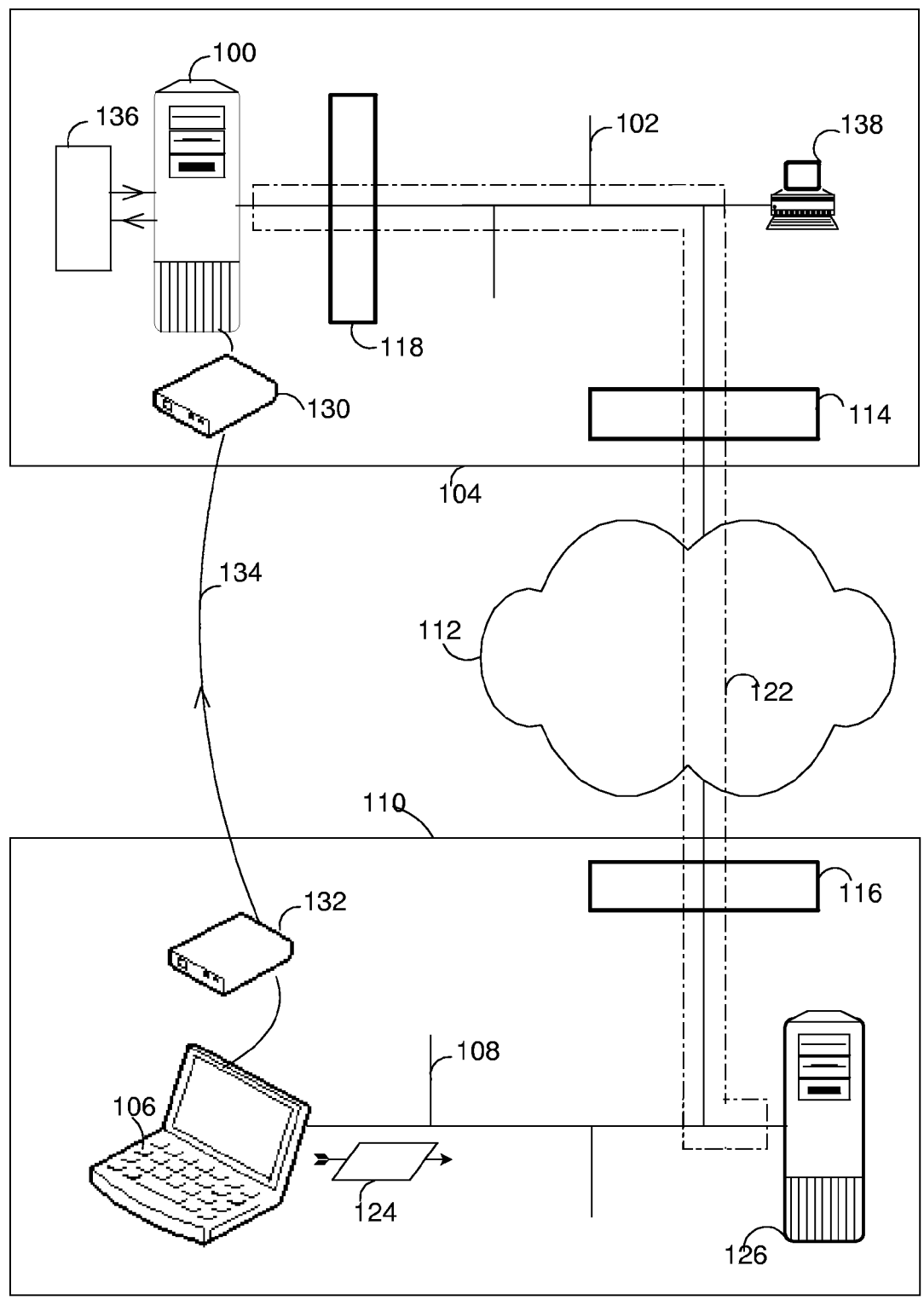
FIG. 1 is a schematic diagram of a networked system of an embodiment of the invention.

FIG. 1 is a schematic diagram of an embodiment of the invention, depicting a first 104 and a second organisation 110 using a public network 112 such as the Internet. A computer system 100 is located within the bounds of the first organisation 104, which for example can be a company, a bank, a government office, or a fabrication facility. The computer system 100 provides useful computing services to the first organisation. For example, the computer system 100 can be a storage server, database or communications system. The computer system can furthermore be coupled to industrial equipment 136, for example a field device or machine, the computer system 100 fulfilling a purpose such as controlling or surveying the industrial equipment 136.

The first 104 and second 110 organisations have respective first 102 and second 108 private networks or intranets. The first 102 and second 108 private networks respectively can include one or more linked local-area networks as well as leased lines spanning longer distances in a wide-area network. The first 102 and second 108 private networks are connected to the public network 112 through respective first 114 and second 116 external firewalls. Each of the firewalls is configured to protect the respective private network from the public network 112. A standard configuration to achieve this protection is to configure the respective external firewalls so that they block network traffic that initiates at the side of the public network 112, while letting pass network traffic that initiates at the side of the respective private network. Depending on the security policies of the network-security managers of the respective private networks, restrictions can be imposed also on the network traffic that initiates at the side of the respective private network, and exceptions can be made, selectively allowing network traffic of a specific kind that initiates at the side of the public network 112. Often such restrictions or exceptions are based on criteria regarding destination network ports, destination network addresses, or originating network addresses.

The computer system 100 is connected to the first private network 102 through a separation firewall 118 that is configured to protect the first private network 102 from the computer system by blocking network traffic that initiates at the side of the computer system 100 and is directed to the first private network 102.

A maintenance computer 106 used for remotely maintaining the computer system 100 is connected to the second private network 108 of the second organisation 110. The second organisation 104 can be the vendor company that has supplied the computer system 100 to the first organisation, a supplier of industrial equipment 136 that the computer system 100 is coupled to, an independent maintenance service provider, or otherwise be responsible for maintaining computer system 100. The maintenance computer 106 can be a mobile device connected to the second private network 108 using virtual-private-network technology, enabling a service technician who carries the maintenance computer 106 to remotely maintain the computer system 100 from an arbitrary location. The maintenance computer can furthermore be connected to a second modem 132 connected to the public telephone line 134. Furthermore, a relay server 126 for relaying network traffic between the maintenance computer 106 and the computer system 100 can be connected to the second private network.

In operation, the networked system is used to establish an isolation pipe 122 using virtual-private-network technology, extending from the computer system 100 through the separation firewall 118, and then over the first private network 102 through the first external firewall 114, and then over the public network 112 through the second firewall, and then over the second private network into the relay server 126. A number of different well-known tunneling protocols are available for implementing the isolation pipe, including internet protocol security (IPSec), open virtual private network, point-to-point tunneling protocol (PPTP), layer 2 forwarding (L2F), layer 2 tunneling protocol (L2TP), and layer 2 tunneling protocol version 3.

The computer system 100 can furthermore be connected to a first modem 130 that is connected to a public telephone line 134. A service technician carrying the maintenance computer 106 uses a second modem 132 connected to the maintenance computer 106 to establish a dialed telephone connection over the public telephone line 134 with the first modem 130, through which a command is then sent to initiate the establishing of the isolation pipe.

Figure 2:
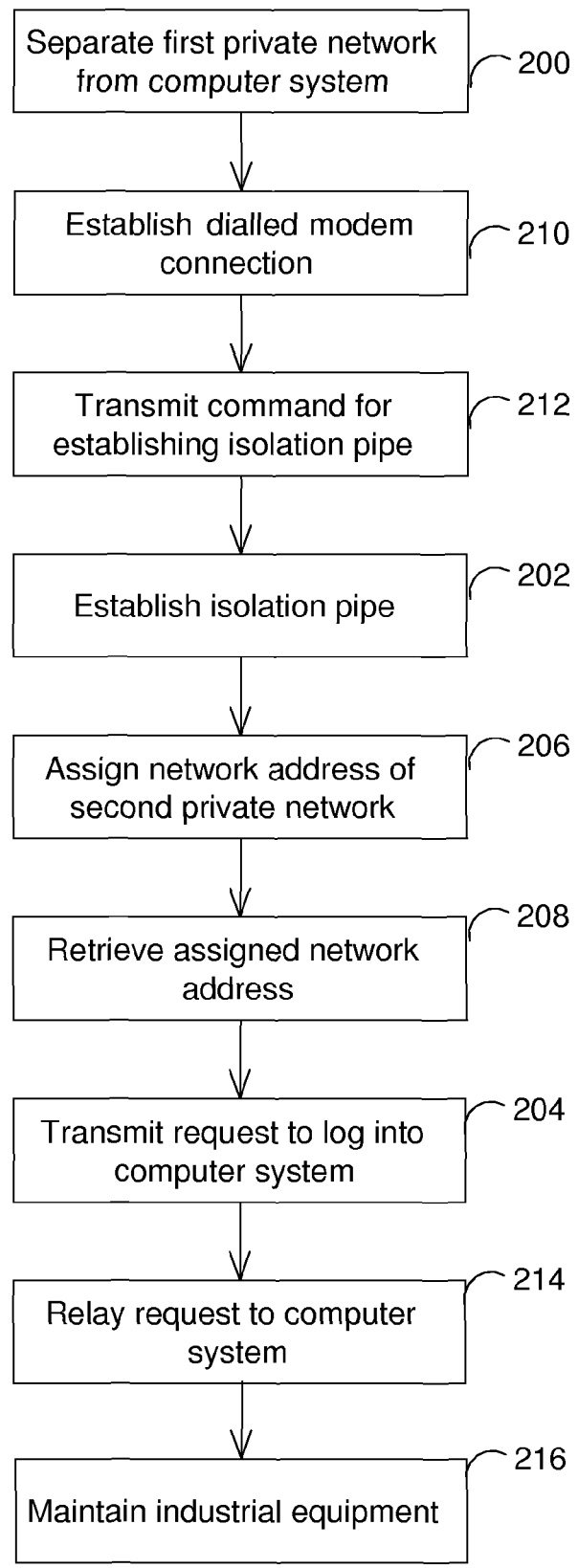
FIG. 2 is a flow chart of a method of an embodiment of the invention.

FIG. 2 shows a flow chart of the method of an embodiment of the invention. In step 200 the first private network is separated from the computer system by a separation firewall configured to block network traffic that initiates at the computer system and is directed to the first private network. This step is the basis for allowing a service technician of the second organisation to remotely maintain the computer system. Preferably, the separation firewall is put under the complete control of the network-security managers of the first organisation, so that service technicians of the second organisation will not be able to change its configuration or otherwise harm its effectiveness.

In step 210, a service technician establishes a dialed modem connection over a public telephone line from a modem connected to the maintenance computer to a modem connected to the computer system. Alternatively, the connection can be established over a wireless network, integrated services digital network, or similar communications network. The details of how, when and under which conditions the second organisation is allowed to establish the dialed modem connection are agreed upon between the first and second organisations.

In step 212, the service technician uses the dialed modem connection to transmit a command over the dialed modem connection to the computer system that causes the computer system to establish an isolation pipe using virtual-private-network technology with a relay server in the second private network. The isolation pipe can alternatively be initiated by system administrators of the computer system, who are located within the first organisation, for example at the personal request of a service technician of the second organisation. The computer system 100 can furthermore be configured to automatically establish the isolation pipe, for example at preconfigured times of the day, or at the occurrence of preconfigured events such as technical problems being detected in the computer system.

In step 202, the isolation pipe is established, extending from the computer system to the relay server, where the relay server can be identical with or separate from the maintenance computer. The respective network addresses of the computer system and relay server preferably are fixed and agreed between the first and second organisations. This improves the security of the networked system because the separation firewall and external firewalls of both organisations can be configured to restrict network traffic for the establishment of the isolation pipe to traffic that initiates at the fixed address of computer system and is destined for the fixed address of the relay server.

After the isolation pipe has been established, in step 206 the relay server assigns an address of the second private network to the computer system. In order to avoid compromising the security of the second private network, this address preferably does not allow the computer system to act as an independent network host on the second private network but is kept at the relay server. In step 208, the maintenance computer contacts the relay server and retrieves the network address that was assigned to the computer system.

In step 204, the service technician uses the network address that the relay server has assigned to the computer system as destination address to transmit a request to log into the computer system. Because the assigned network address is a regular network address of the second private network owned by the relay server, the request to log into the computer system is received by the relay server.

In step 214, the relay server replaces the destination address of the request to log into the computer system with the address of the computer system that is valid within the isolation pipe and retransmits the request through the isolation pipe to the computer system. The computer system receives the request, verifies the login request and waits for further commands from to be received from the maintenance computer. In step 216, the service technician uses the control gained over the computer system after successfully logging into the computer system to maintain industrial equipment that is connected to the computer system.

The steps that have been described as actions of the service technician can also be performed by an automatic maintenance system installed on the maintenance computer.

Figure 3:
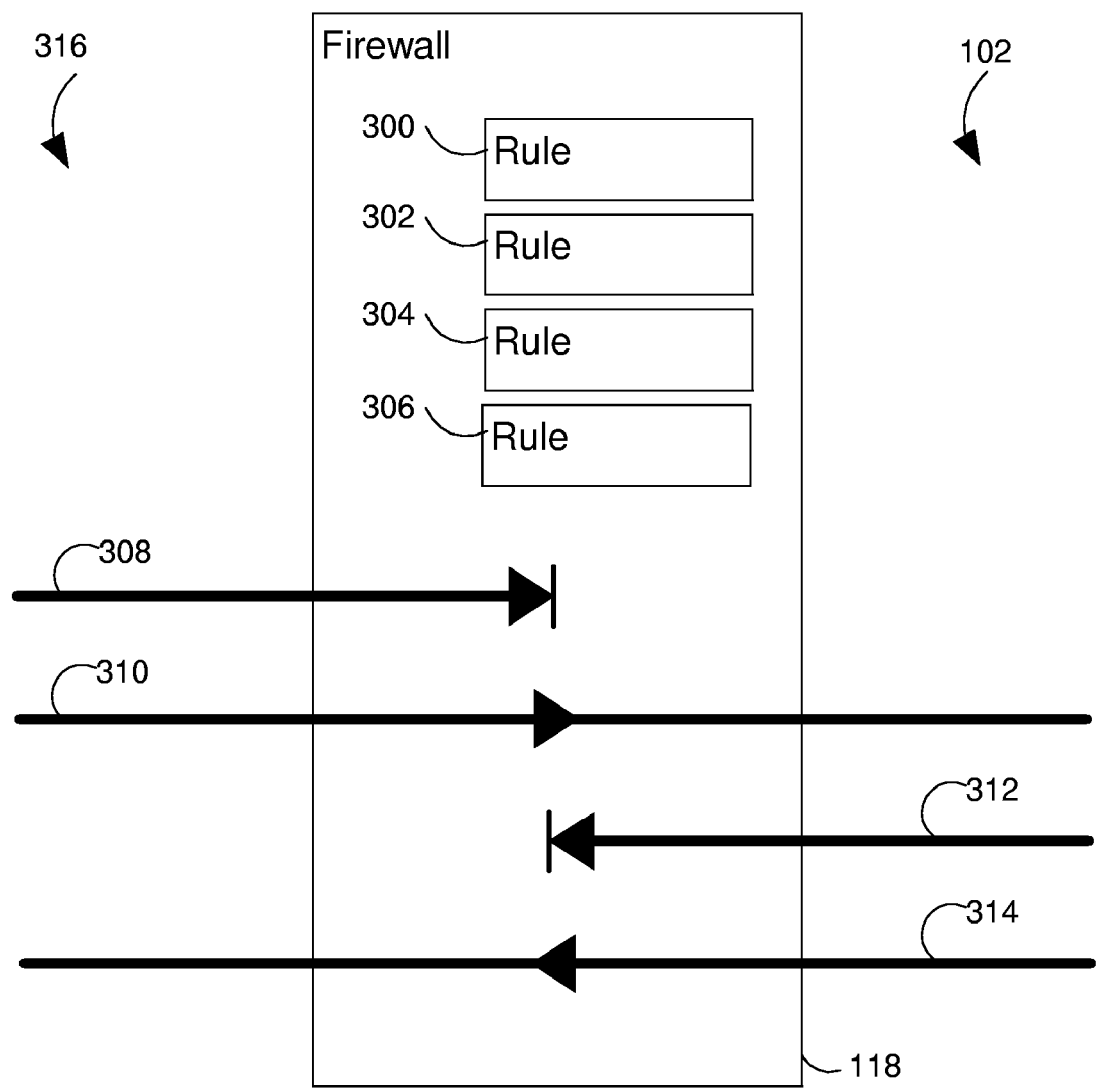
FIG. 3 is a block diagram of a separation firewall of an embodiment of the invention.

FIG. 3 shows a block diagram of the separation firewall 118 of an embodiment of the invention. The separation firewall 118 separates the first private network 102 from a separate network region formed by the computer system, creating a separated network region 316, where the computer system is located. In this separated region 316 further computer systems maintained by the second organisation can be placed, to be maintained in the same way as computer system 100.

The separation firewall 118 comprises a first filtering rule 300 for blocking network traffic 308 that initiates at the computer system and is directed to the first private network. This rule serves to protect the first private network from actions originating at the separated network region 316. For example, the first filtering rule prevents a service technician of the first organisation, remotely or locally in complete control of the computer system, from reading sensitive data from a computer in the first private network 102 or performing harmful actions to such a computer.

The separation firewall 118 comprises a second filtering rule 302 for letting pass network traffic 310 for the establishing of the isolation pipe that initiates at the computer system. This second filtering rule 302 can for example be formulated as an exception to the first filtering rule 300. In order to keep the protection for the first private network 102 at the highest possible level while allowing the isolation pipe to be established, the second filtering rule 302 is preferably formulated as specific as possible. For example, the second filtering rule 302 can allow network traffic if it initiates at the computer system, is directed to the relay server, and is addressed to network ports specific to the virtual-private-network protocol used.

The separation firewall 118 comprises a third filtering rule 304 for blocking network traffic 312 that initiates at the first private network. The third filtering rule 304 serves to protect the separated network region 316 of the computer system from possible harmful actions performed by computer systems in the first private network 102.

The separation firewall 118 comprises a fourth filtering rule 306 for letting pass network traffic 314 that initiates at the first private network and is directed to a network port of the computer system available for administering the computer system. In this way system administrators of the first organisation can be allowed to conveniently administer the computer system from their client computers. This fourth filtering rule 306 can for example be formulated as an exception to the third filtering rule 304. In order to keep the protection for the separated network region 316 of the computer system at the highest possible level while allowing the computer system to be administered from the first private network, the fourth filtering rule 306 is preferably formulated as specific as possible. For example, the fourth filtering rule 306 can allow network traffic if it initiates at a particular client computer of a system administrator, is directed to the computer system, and is addressed to network ports specific to the administration protocol used.

Further rules can be added to the separation firewall 118 to account for specific purposes, properties, and requirements of the computer system. For example, network traffic for automatically sending electronic mail can be allowed to pass from the computer system to a specific electronic mail server in the second private network.

Figure 4:
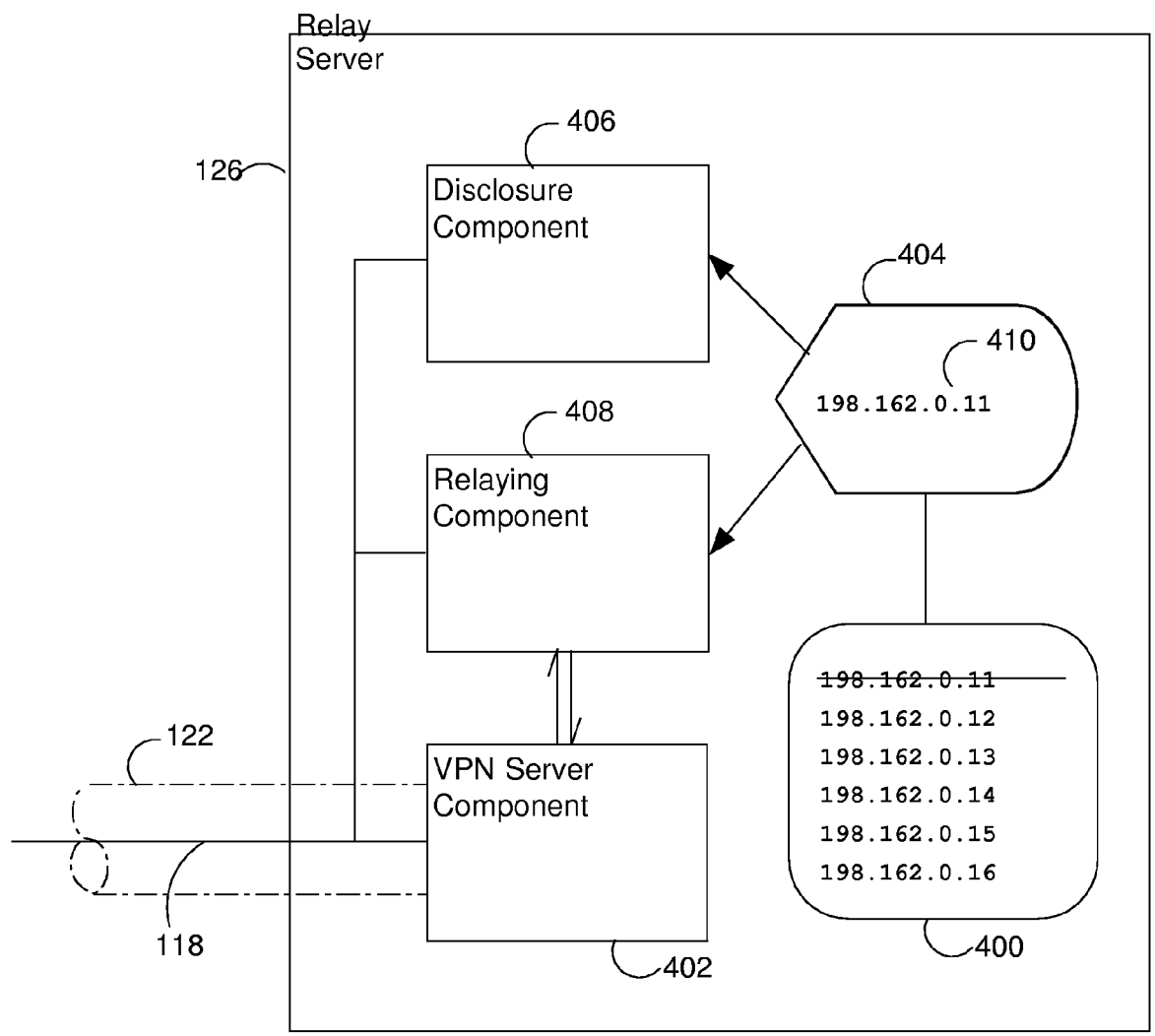
FIG. 4 is a block diagram of a relay server of an embodiment of the invention.

FIG. 4 shows a block diagram of the relay server 126 of an embodiment of the invention. The relay server comprises a virtual-private-network server component 402 for establishing the isolation pipe 122 extending from the computer system to the relay server 126. The relay server is registered under a set of network addresses 400, which are valid addresses of the relay server itself within the second private network 118, so that network traffic addressed to one of these addresses from a computer within the second private network 118 is routed to the relay server. The relay server 126 further comprises an assignment component 404 for assigning one 410 of the set 400 of network addresses to the computer system. The relay server 126 further comprises a disclosure component 406 for disclosing to the maintenance computer the one 410 of the set of network addresses, and a relaying component 408 for relaying network traffic between the maintenance computer and the computer system.

In operation, the relay server listens on the second private network 108 for network traffic initiating at the computer system and requesting the establishment of the isolation pipe 122. When receiving such network traffic, the virtual-private-network server component 402 responds to the computer system, resulting in the establishment of the isolation pipe 122. At the side of relay server 126, the virtual-private-network server component 402 forms the endpoint of the isolation pipe.

After the establishment of the isolation pipe 122, the assignment component 404 assigns one network address 410 of the set of network addresses 400 to the computer system and provides it to the disclosure 406 and relaying 408 components. The disclosure component 406 is now ready to be contacted from a maintenance computer in the second private network 108. A service technician intending to remotely maintain computer system at this stage contacts relay server 126 from the maintenance computer and is disclosed the assigned network address 410 by the disclosure component 406.

The service technician now creates a request to log into the computer system and transmits it over the second private network 108, using as destination address the one 410 of the network addresses 400. The request is received by the relay server 126, readdressed by the relaying component and sent through the virtual-private-network server component 402 over the isolation pipe 122 to the computer system.

| List of Reference Numerals | |
|---|---|
| 100 | Computer system |
| 102 | First private network |
| 104 | First organisation |
| 106 | Maintenance computer |
| 108 | Second private network |
| 110 | Second organisation |
| 112 | Public network |
| 114 | First external firewall |
| 116 | Second external firewall |
| 118 | Separation firewall |
| 122 | Isolation pipe |
| 124 | Login request |
| 126 | Relay server |
| 130 | First modem |
| 132 | Second modem |
| 134 | Public telephone line |
| 136 | Industrial equipment |
| 138 | Client computer |
| 200 | Separating of first private network and computer system |
| 202 | Establishing of isolation pipe |
| 204 | Transmitting of login request |
| 206 | Assigning of network address |
| 208 | Retrieving of network address |
| 210 | Establishing of telephone connection |
| 212 | Transmitting of command for establishing isolation pipe |
| 214 | Relaying of request to computer system |
| 216 | Maintaining of industrial equipment |
| 300 | First filtering rule |
| 302 | Second filtering rule |
| 304 | Third filtering rule |
| 306 | Fourth filtering rule |
| 308, 310, 312, 314 | Network traffic |
| 316 | Separated network region of the computer system |
| 400 | Set of network addresses |
| 402 | Virtual-private-network server component |
| 404 | Assignment component |
| 406 | Disclosure component |
| 408 | Relaying component |
| 410 | Network address of the set assigned to the computer system |

The invention claimed is:

1. A method of remotely maintaining a computer system comprising:
separating a first private network from the computer system using a separation firewall configured to block network traffic that initiates at the computer system and is directed to the first private network, and to selectively let pass at least some network traffic that initiates at the first private network and is directed to the computer system;
wherein the computer system is connected to the first private network of a first organization, and is remotely maintained from a maintenance computer, the maintenance computer being connected to a second private network of a second organization, the first and second private networks being connected to a public network and being protected from the public network by respective first and second external firewalls, said first firewall being different from said separation firewall;
establishing an isolation pipe extending from the separation firewall over the first private network to the first external firewall; and,
transmitting a request to log into the computer system from the maintenance computer through the isolation pipe to the computer system.

2. The method of claim 1, wherein the request is transmitted through the isolation pipe using a tunnelling protocol selected from the group consisting of: internet protocol security, open virtual private network, point-to-point tunnelling protocol, layer 2 forwarding, layer 2 tunnelling protocol, and layer 2 tunnelling protocol version 3.

3. The method of claim 1, wherein the separation firewall is further configured to selectively block at least some network traffic that initiates at the first private network.

4. The method of claim 1, wherein the separation firewall is configured to let pass network traffic that initiates at the first private network and is directed to a network port of the computer system available for administering the computer system.

5. The method of claim 1, wherein the first private network comprises a client computer, the separation firewall being configured to let pass network traffic initiating at the client computer and directed to the computer system.

6. The method of claim 1, wherein the isolation pipe further extends through the first external firewall over the public network and then through the second external firewall over the second private network to a relay server connected to the second private network.

7. The method of claim 6 further comprising:
assigning one of a set of network addresses to the computer system by the relay server; and retrieving the one of the set of network addresses from the relay server by the maintenance computer;
wherein the request is addressed to the computer system using the one of the set of network addresses by the maintenance computer, and relayed through the isolation pipe to the computer system by the relay server,
and wherein the relay server comprises the set of network addresses of the second private network.

8. The method of claim 1, wherein the computer system is coupled to industrial equipment located within a facility of the first organization, the method further comprising:
remotely maintaining the industrial equipment from the maintenance computer via the computer system.

9. A method of remotely maintaining a computer system comprising:
separating a first private network from the computer system using a separation firewall configured to block network traffic that initiates at the computer system and is directed to the first private network;
establishing an isolation pipe extending from the separation firewall over the first private network to a first external firewall; and, transmitting a request to log into the computer system from a maintenance computer through the isolation pipe to the computer system;

wherein the computer system is connected to the first private network of a first organization, and is remotely maintained from the maintenance computer, the maintenance computer being connected to a second private network of a second organization, the first and second private networks being connected to a public network and being protected from the public network by respective first and second external firewalls, said first firewall being different from said separation firewall;

wherein the computer system is connected to a first modem, the maintenance computer is connected to a second modem, the first and second modem each being connected to a public telephone line, the method further comprising:

establishing a dialed telephone connection from the second modem to the first modem; and, transmitting a command for the establishing of the isolation pipe, from the maintenance computer over the dialed telephone connection to the computer system.

10. A networked system for allowing remote maintenance of a computer system connected to a first private network of a first organization from a maintenance computer connected to a second private network of a second organization, the first and second private networks being connected to a public network and being protected from the public network by respective first and second external firewalls, the networked system comprising:

a separation firewall for separating the first private network from the computer system, said separation firewall being different from said first firewall, means for establishing an isolation pipe using virtual-private-network technology, the isolation pipe extending from the separation firewall over the first private network to the first external firewall, and a first filtering rule of the separation firewall for blocking network traffic that initiates at the computer system and is directed to the first private network, a second filtering rule of the separation firewall for letting pass network traffic for the establishing of the isolation pipe that initiates at the computer system, a third filtering rule of the separation firewall for selectively letting pass at least some network traffic that initiates at the first private network and is directed to the computer system, means for transmitting a request to log into the computer system from the maintenance computer through the isolation pipe to the computer system.

11. The networked system of claim 10, the isolation pipe further extending through the first external firewall over the public network and then through the second firewall over the second private network to a relay server connected to the second private network.

12. The networked system of claim 11, wherein the relay server comprises:

an assignment component for assigning one of a set of network addresses of the second private network to the computer system, a disclosure component for disclosing to the maintenance computer the one of the set of network addresses, and a relaying component for relaying to the computer system a request to log into the computer system transmitted by the maintenance computer to the computer system using the one of the set of network address.

13. The networked system of claim 10, further comprising a fourth filtering rule of the separation firewall for blocking at least some network traffic that initiates at the first private network.

14. The networked system of claim 10, wherein said third filtering rule of the separation firewall is for letting pass network traffic that initiates at the first private network and is directed to a network port of the computer system available for administering the computer system.

15. The networked system of claim 10, further comprising:

a first modem connected to the computer system, a second modem connected to the maintenance computer, means for establishing a dialed telephone connection from the second modem to the first modem over a public telephone line, and means for transmitting a command for the establishing of the isolation pipe, from the maintenance computer over the dialed telephone connection to the computer system.

16. The networked system of claim 10, further comprising:

industrial equipment coupled to the computer system and located within a facility of the first organization, and means for remotely maintaining the industrial equipment from the maintenance computer via the computer system.

* * * * *